United States Patent
Jenkins et al.

(10) Patent No.: US 10,410,002 B1
(45) Date of Patent: Sep. 10, 2019

(54) INTRUSION DETECTION APPARATUS, SYSTEM AND METHODS

(71) Applicant: National Technology & Engineering Solutions of Sandia, LLC, Albuquerque, NM (US)

(72) Inventors: Chris Jenkins, Albuquerque, NM (US); Alexander Roesler, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 106 days.

(21) Appl. No.: 15/341,279

(22) Filed: Nov. 2, 2016

Related U.S. Application Data

(60) Provisional application No. 62/278,181, filed on Jan. 13, 2016.

(51) Int. Cl.
| | |
|---|---|
| *G06F 21/60* | (2013.01) |
| *G06F 13/42* | (2006.01) |
| *H04L 29/06* | (2006.01) |
| *G06F 21/85* | (2013.01) |

(52) U.S. Cl.
CPC ........ *G06F 21/606* (2013.01); *G06F 13/4282* (2013.01); *G06F 21/60* (2013.01); *G06F 21/85* (2013.01); *H04L 63/123* (2013.01); *H04L 63/126* (2013.01); *H04L 63/1466* (2013.01)

(58) Field of Classification Search
CPC ........ G06F 21/606; G06F 21/85; G06F 21/60; H04L 63/123; H04L 63/126; H04L 63/1466
See application file for complete search history.

(56) References Cited

U.S. PATENT DOCUMENTS

| | | | |
|---|---|---|---|
| 5,325,359 A | 6/1994 | Jordan et al. | |
| 6,037,902 A | * 3/2000 | Pinhas | G01S 7/032 340/522 |
| 6,195,768 B1 | 2/2001 | Green | |
| 6,212,224 B1 | 4/2001 | Cammarota et al. | |

(Continued)

OTHER PUBLICATIONS

Liu Shengjian, Yang Haiyan and Wang Fengni, "Design of network security early-warning system based on network defense in depth model," Proceedings of 2013 2nd International Conference on Measurement, Information and Control, Harbin, 2013, pp. 355-359. (Year: 2013).*

(Continued)

*Primary Examiner* — Kari L Schmidt

(74) *Attorney, Agent, or Firm* — Medley, Behrens & Lewis, LLC

(57) ABSTRACT

Described herein are various technologies for detection and mitigation of rogue terminal attacks on multiplex data buses. An intrusion detection device is incorporated between a bus controller and a bus of a multiplex data bus. The intrusion detection device receives message that are communicated among the bus controller and a plurality of remote terminals (by way of the bus). The intrusion detection device determines whether messages are unauthorized based upon origins of the messages and predefined rules. When a message is determined to be unauthorized, the intrusion detection device outputs a notification that the unauthorized message has been detected and can block the unauthorized message.

17 Claims, 4 Drawing Sheets

(56) References Cited

U.S. PATENT DOCUMENTS

| | | | |
|---|---|---|---|
| 7,761,923 B2* | 7/2010 | Khuti | H04L 63/02 726/11 |
| 8,955,130 B1* | 2/2015 | Kalintsev | G06F 21/567 701/415 |
| 9,389,812 B2* | 7/2016 | Yoda | G06F 3/121 |
| 9,773,130 B2* | 9/2017 | Collins | G06F 21/85 |
| 10,083,071 B2* | 9/2018 | Sonalker | G06F 11/0739 |
| 2003/0221030 A1* | 11/2003 | Pontius | G06F 12/1483 710/107 |
| 2006/0130141 A1* | 6/2006 | Kramer | G06F 21/562 726/23 |
| 2006/0206921 A1* | 9/2006 | Wang | G06F 21/606 726/3 |
| 2006/0236351 A1 | 10/2006 | Ellerbrock et al. | |
| 2007/0160075 A1* | 7/2007 | Carpassi | H04L 12/40032 370/451 |
| 2009/0132748 A1 | 5/2009 | Sheffield | |
| 2010/0174838 A1 | 7/2010 | Emma | |
| 2010/0174887 A1* | 7/2010 | Pawlowski | G06K 9/00986 712/36 |
| 2011/0283143 A1* | 11/2011 | Collins | G06F 21/85 714/37 |
| 2013/0254442 A1* | 9/2013 | Robillard | G06F 21/85 710/107 |
| 2014/0195808 A1* | 7/2014 | Lortz | G06F 15/177 713/170 |
| 2014/0283063 A1* | 9/2014 | Thompson | H04L 61/1511 726/23 |
| 2014/0325654 A1* | 10/2014 | Denis | G06F 21/568 726/24 |
| 2015/0089099 A1 | 3/2015 | Huber et al. | |
| 2015/0113621 A1* | 4/2015 | Glickfield | H04L 63/08 726/7 |
| 2016/0056906 A1* | 2/2016 | Lassini | H04J 3/1694 370/442 |
| 2016/0261465 A1* | 9/2016 | Gupta | H04L 12/2816 |
| 2017/0177854 A1* | 6/2017 | Gligor | G06F 21/44 |
| 2018/0060267 A1* | 3/2018 | Sutton | H04L 12/40032 |
| 2018/0307577 A1* | 10/2018 | Eckhardt | G06F 11/349 |
| 2018/0307645 A1* | 10/2018 | Eckhardt | H04L 12/40026 |
| 2018/0307845 A1* | 10/2018 | Eckhardt | G06F 21/60 |

OTHER PUBLICATIONS

Z. Pan, S. Hariri and Y. Al-Nashif, "Anomaly based intrusion detection for Building Automation and Control networks," 2014 IEEE/ACS 11th International Conference on Computer Systems and Applications (AICCSA), Doha, 2014, pp. 72-77. (Year: 2014).*

Ravi, Srivaths, et al. "Security in embedded systems: Design challenges." ACM Transactions on Embedded Computing Systems (TECS) 3.3 (2004): 461-491. (Year: 2004).*

M. Vai et al., "Systems design of cybersecurity in embedded systems," 2016 IEEE High Performance Extreme Computing Conference (HPEC), Waltham, MA, 2016, pp. 1-6. (Year: 2016).*

* cited by examiner

INTRUSION DETECTION APPARATUS, SYSTEM AND METHODS

RELATED APPLICATION

This application claims priority to U.S. Provisional Patent Application No. 62/278,181, filed on Jan. 13, 2016, entitled "INTRUSION DETECTION APPARATUS, SYSTEM AND METHODS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Multiplex data buses in vehicles (e.g., automobiles, airplanes, etc.) provide communication among vehicle components and subsystems over a wire. For example, MIL-STD-1553B is a multiplex data bus standard, where a multiplex data bus according to such standard provides real-time communication for remote terminals on the multiplex data bus. Remote terminals, under MIL-STD-1553B, comprise components and subsystems of military and civil aircraft (e.g., avionics components, communications subsystems, etc.). Architecture of multiplex data buses requires that a bus controller initiate communication among the remote terminals on the bus by transmitting, by way of the bus, messages that comprise command words to the remote terminals. Each of the remote terminals receives and parses the messages to determine whether the messages comprise addresses of the remote terminals. Responsive to determining that a message comprises an address of a remote terminal, the addressed remote terminal acts in accordance with the instructions included in the message.

It is possible for the multiplex data bus to become compromised by a rogue terminal attack (e.g., a where a remote terminal is modified or controlled by a malicious actor and acts as a rogue terminal). When a remote terminal attack occurs, a rogue terminal can transmit messages, comprising command words, on the bus. Because remote terminals that listen for messages on the bus do not validate the origin of the messages, the remote terminals receive and parse the messages. When one of the messages includes an address of a remote terminal on the bus, the addressed remote terminal executes instructions in the message. The message could comprise instructions that, when executed by the addressed remote terminal, result in the remote terminal being manipulated (or other remote terminals on the bus being manipulated). Further, the addressed remote terminal, when executing malicious instructions, may overwrite firmware of a bus controller connected to the bus with malicious code.

SUMMARY

The following is a brief summary of subject matter that is described in greater detail herein. This summary is not intended to be limiting as to the scope of the claims.

Described herein are features related to a system that can detect and mitigate rogue terminal attacks on multiplex data buses. On a multiplex data bus, such as a bus that accords to MIL-STD-1553B, an intrusion detection device can be incorporated between a bus controller and the bus (where remote terminals communicate with one another by way of the bus), such that the intrusion detection device monitors messages on the bus. Due to the location of the intrusion detection device, the intrusion detection device can determine whether a message originates from the bus controller or from some other remote terminal on the bus.

The intrusion detection device can further determine whether the message violates one or more predefined rules based upon whether the message originates from the bus controller or from some other remote terminal on the bus. Examples of predefined rules include: 1) the bus controller can only send messages that comprise valid commands; 2) the bus controller cannot send messages that would put the standard bus in an unsafe or corrupted state; 3) remote terminals cannot send messages that comprise bus commands; and 4) remote terminals cannot send harmful and/or corrupt data (to the bus controller and/or other remote terminals). After determining that a message violates one or more of the predefined rules, the intrusion detection device can output an indication that the message is unauthorized. The set of a predefined rules, alternatively, can comprise a state machine model of permitted messages. The state machine model for a multiplex data bus comprises a history of past states of a communications system that includes the multiplex data bus, thereby allowing for expected (or acceptable) state transitions to be determined. If a message causes the state of the communications system to transition in a manner that is unexpected or unacceptable, the intrusion detection device can output an indication that the message is potentially malicious.

In addition to outputting the indication that the message is unauthorized, the intrusion detection device can be configured to block unauthorized messages. For example, responsive to determining that a message (from a remote terminal) comprises bus commands, the intrusion detection device can be configured to prevent the message from being transmitted to other remote terminals (by way of the bus).

In another embodiment, in addition to or in the alternate to incorporating the intrusion detection device between a bus controller and the bus, stub intrusion detection devices can be positioned between remote terminals and the bus, such that the stub intrusion detection devices can receive and analyze messages from remote terminals prior to the messages reaching the bus.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
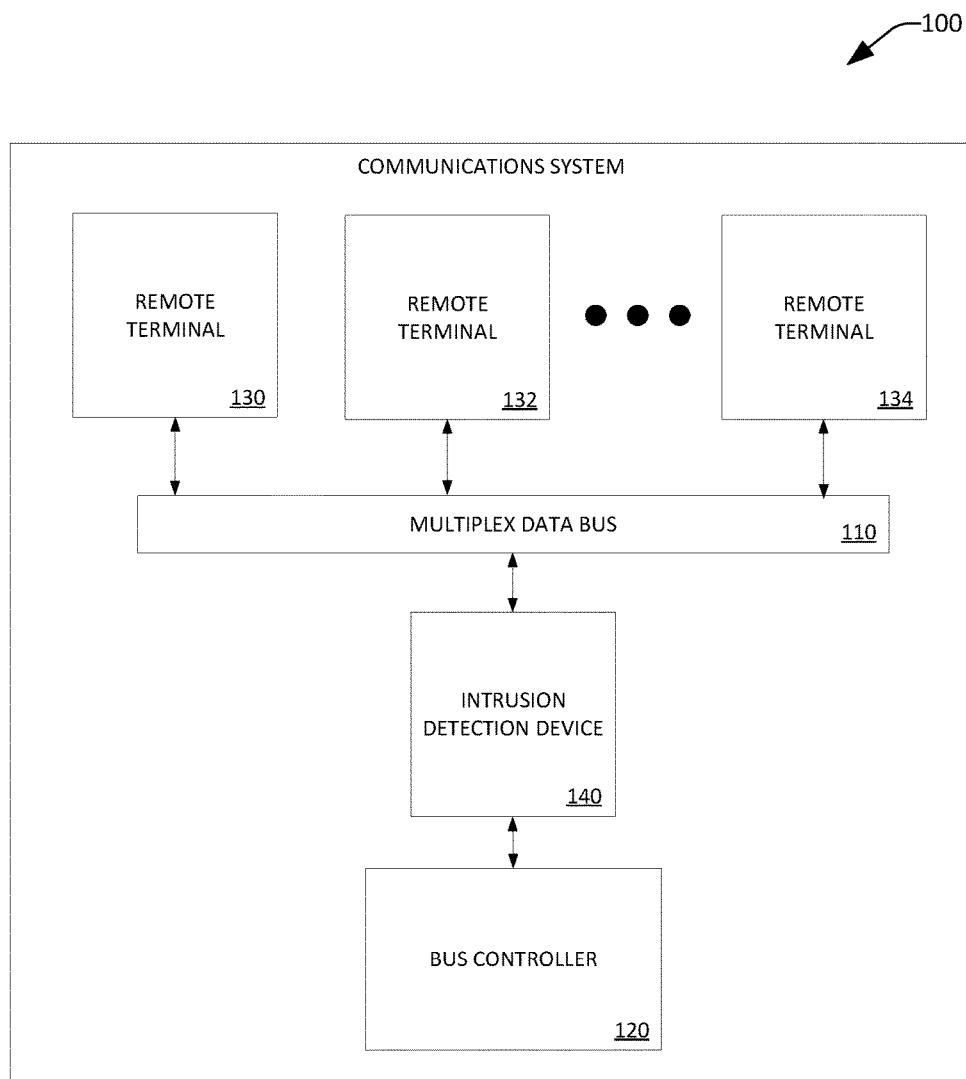
FIG. 1 is a functional block diagram of an exemplary communications system where communications are transmitted over a multiplex data bus, and wherein the communications system includes an intrusion detection device that is configured to detect rogue terminal attacks.

Various technologies are presented herein pertaining to detection and mitigation of rogue terminal attacks on multiplex data buses, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

With reference now to FIG. 1, an exemplary communications system 100 is illustrated. The communications system 100 comprises a bus controller 120, n remote terminals 130-134, and an intrusion detection device 140, which communicate with one another by way of a multiplex data bus 110. The remote terminals 130-134 can comprise components of a vehicle that are configured to communicate with other components of the vehicle by way of the bus 110. For instance, the remote terminals 130-134 can include a sensor module, an actuator, a display, etc. Further, the remote terminals 130-134 can include a device that forms at least a portion of a safety subsystem, a device that forms at least a portion of a communications subsystem, etc. In a more specific example, in a military aircraft incorporating a communications system where terminals communicate over a bus that accords to MIL-STD-1553B, remote terminals can include flight instruments, sensors, weapons instruments, and other subsystems whose communications are governed by such standard (or other multiplex data bus standards, such as MIL-STD-1760B).

The bus controller 120 communicates various messages (e.g., command words or data messages) to the remote terminals 130-134 on the bus 110 by way of the intrusion detection device 140, where, as shown in FIG. 1, the intrusion detection device 140 is positioned between the bus controller 120 and the bus 110. Therefore, all messages directed to the remote terminals 130-134 from the bus controller 120 pass through the intrusion detection device 140. Additionally, the remote terminals 130-134 communicate various messages (e.g., status words or data messages) to the bus controller 120 by way of the bus 110 and the intrusion detection device 140.

Due to the architecture of the exemplary communications system 100, messages placed on the bus 110 are received by all components connected to the bus 110. When the bus controller 120 directs a message to the remote terminal 130 by way of the bus 110, for example, the remaining plurality of remote terminals 132-134 receive the message, even though the message is not directed to the remote terminals 132-134. Similarly, when one of the plurality of remote terminals 130-134 directs a message to the bus controller 120 or another of the remote terminals 130-134 by way of the bus 110, all modules on the bus 110 receive such message. When a message is placed on the bus 110 (e.g., by the remote terminal 130 in the remote terminals 130-134), the bus controller 120 and remote terminals 132-134 receive and parse the message and each of the bus controller 120 and the remote terminals 132-134 determine whether the message includes instructions for the remote terminal or bus controller 120. For example, in a military aircraft incorporating a bus that accords to MIL-STD-1553B, the bus controller 120 can transmit a command word comprising 16 bits to the bus 110, where the first five bits comprise an address of the remote terminal 130. Each of the remote terminals 130-134 parses the command word and ascertains whether the five bits identify the receiving remote terminal. The remote terminal 130, upon determining that the command word comprises the address of the remote terminal 130, can execute the instructions included in the command word. Because the command word does not include the address of the remote terminals 132-134, the remote terminals 132-134 discard the message and do not execute the instructions in the command word.

Further, due to the architecture of the exemplary multiplex data bus 100, only the bus controller 120 is to initiate communications amongst the remote terminals 130-134 connected to the bus 110. More particularly, in the exemplary multiplex data bus 110, the bus controller 120 is configured to generate messages to the remote terminals 130-134 (by way of the intrusion detection device 140 and bus 110), where the messages include respective command words. The command words can comprise instructions for the addressed remote terminal to, for example, receive subsequent data (from the bus controller 120), transmit data to the bus controller 120, and/or transmit data to another remote terminal on the bus 110. For instance, in a military aircraft incorporating a bus that accords to MIL-STD-1553B, to initiate communication from the remote terminal 130 to the remote terminal 132, the following occurs: 1) the bus controller 120 places a first message on the bus 110, where the first message comprises an address of the remote terminal 132 and an indication that the second remote terminal is to receive data; 2) the bus controller 120 places a second message on the bus, where the second message comprises an address of the remote terminal 130 and an indication that the remote terminal 130 is to transmit data to the remote terminal 132; 3) the remote terminal 130 transmits the data to the remote terminal 132.

The intrusion detection device 140 can be or include a hardware logic device such as a field-programmable gate array (FPGA), a multi-core device in communication with an FPGA, a multi-core device in communication with a programmable fabric, a processor, etc., wherein the hardware logic device is configured to perform detection and mitigation of rogue terminal attacks on multiplex data buses. Furthermore, while certain functionality is described herein as being performed by the intrusion detection device 140, in some embodiments the intrusion detection device 140 can perform various operations in conjunction with other systems and/or devices (e.g., bus monitors).

The intrusion detection device 140, incorporated between the bus 110 and the bus controller 120, can determine the origin of messages directed to the bus 110 by the bus controller 120 and placed on the bus 110 by the remote terminals 130-134. In an example, the intrusion detection device 140 receives messages on a primary port from the bus controller 120 and transmits the messages on a secondary port to the bus 110. Similarly, the intrusion detection device 140 can receive (by way of the bus 110) a message from one of the remote terminals 130-134 on the secondary port and transmit the message to the bus controller 120 on the primary port. Based upon whether the intrusion detection device 140 receives a message on the primary port or the secondary port, the intrusion detection device 140 can determine whether the message originates from the bus controller 120 (due to the message being received on the primary port) or from one of the remote terminals 130-134 by way of bus 110 (due to the message being received on the secondary port).

Details of operation of the intrusion detection device 140 are now described. The intrusion detection device 140 provides detection and mitigation of rogue terminal attacks for the exemplary communications system 100. The intrusion detection device 140 receives messages output by the bus controller 120, and further receives messages placed on the bus 110 by the remote terminals 130-134. For each message, the intrusion detection device 140 determines an origin of the message (based upon whether the message was received on a primary port or a secondary port) and compares the message and the origin of the message to a set of rules defining desired operating conditions for the communications system 100. Based upon a comparison of the message and the origin of the message to the set of rules, the intrusion detection device 140 determines whether the message is authorized or unauthorized. When the intrusion detection device 140 determines that a message is unauthorized, the intrusion detection device 140 can output an indication that an unauthorized message has been detected. The indication can be output as a visual message (e.g. a notification that an unauthorized message has been detected) to a remote terminal that comprises a display or a computing system.

As indicated previously, the intrusion detection device 140 can determine whether a message is unauthorized based upon a set of predefined rules. Examples of predefined rules that can be employed by the intrusion detection device 140 include: 1) the bus controller can only send messages that comprise valid commands; 2) the bus controller cannot send messages that would put the standard bus in an unsafe or corrupted state; 3) remote terminals cannot send messages that comprise bus commands; and 4) remote terminals cannot send harmful and/or corrupt data (to the bus controller and/or other remote terminals). It can be ascertained that other predefined rules can be implemented based on the requirements of particular multiplex data buses. After determining that a message violates one or more of the predefined rules, the intrusion detection device 140 can output a notification that a that an unauthorized message has been detected.

In an example where the intrusion detection device 140 receives a message from the bus controller 120, and further, when the intrusion detection device 140 employs a rule that indicates that the bus controller 120 can only send messages that comprise valid commands, the intrusion detection device 140 determines that the origin of the message is the bus controller 120 based upon the message being received on the primary port of the intrusion detection device 140. The intrusion detection device 140 determines whether the message comprises a valid command by comparing the message to a list of approved commands for the bus controller 120. The list of approved commands can include instructions for one or more of the remote terminals 130-134 that would occur under normal operating conditions of the vehicle (e.g., aircraft) that includes the communication system 100. If the message does not match one of the approved commands, then the intrusion detection system 140 determines that the message is unauthorized and outputs an indication that the unauthorized message has been detected.

In another example, where the intrusion detection device 140 utilizes the rule that that defines that the bus controller cannot send messages that would put the communications system 100 in an unsafe or corrupted state, the intrusion detection device 140 receives a message and determines that the origin of the message is the bus controller 120 based upon the message being received on the primary port of the intrusion detection device 140. The intrusion detection device 140 determines whether the message would put the communications system 100 in an unsafe or corrupted state by comparing the message to a list of commands for the communications system 100 that, if executed by one or more of the remote terminals 130-134, would cause the communications system 100 to enter an unsafe state or corrupted state. For example, the unsafe state can comprise a situation where at least one of the remote terminals 130-134 operates beyond its conventional operating limits; the corrupted state can comprise a situation where the communications system 100 is rendered inoperable. When the message matches one of the commands in the list, then the intrusion detection system 140 determines that the message is unauthorized and outputs an indication that the unauthorized message has been detected.

In an example where the intrusion detection device 140 employs a rule that indicates that the remote terminals 130-134 are prohibited from sending messages that comprise bus commands, the intrusion detection device 140 can receive a message from the bus 110 and can determine that the origin of the message is one of the remote terminals 130-134 based upon the message being received on the secondary port of the intrusion detection device 140. The intrusion detection device 140 then determines whether the message comprises bus commands. Bus commands comprise instructions that only a bus controller would send in a conventional multiplex data bus. If the message (from one of the remote terminals 130-134) comprises a bus command, then the intrusion detection system 140 can determine that the message is unauthorized and can output an indication that the unauthorized message has been detected.

In an example where the intrusion detection device 140 employs a rule that indicates that the remote terminals are to be prevented from placing harmful and/or corrupt data on the bus 110 (e.g., directed to the bus controller 120 and/or other remote terminals), the intrusion detection device 140 can receive a message from the bus 110 and can determine that the origin of a message is one of the remote terminals 130-134 based upon the message being received on the secondary port of the intrusion detection device 140. The intrusion detection device 140 determines whether the data is corrupt by testing whether the data matches data that would be sent by a remote terminal in a conventional multiplex data bus. The intrusion detection device 140 further tests whether the data is harmful by determining whether the data would render the multiplex data bus 100 inoperable (e.g., an instruction for the bus controller 120 to overwrite its firmware would potentially render the communications system 100 inoperable). If the data is harmful and/or corrupt, then the intrusion detection system 140 determines that the data is unauthorized and outputs an indication that the unauthorized message has been detected.

In another embodiment, rather than employing a set of rules, the intrusion detection device 140 can utilize a state machine model when determining whether messages are unauthorized or malicious. The state machine model comprises a representation of expected state transfers for components on the bus 110, wherein the state machine model can be predefined or learned based upon monitored communications over the bus 110. In an example, the intrusion detection device 140 can receive a message (from the bus controller 120 or from the bus 110), and can determine the origin of the message based upon whether the message was received on the primary port or the secondary port. The intrusion detection device 140 can further have knowledge of the current state of the bus 110 (e.g., the states of the remote terminals 130-134). Based upon the origin of the message and content of the message, the intrusion detection device 140 can ascertain a state transition that is to be caused when instructions in the message are followed by the intended recipient of the message. If the state transition is expected (or acceptable), the intrusion detection device 140 can ascertain that the message is authorized. When, however, the state transition is unexpected, the intrusion detection device 140 can determine that the message is an unauthorized message.

When the intrusion detection device 140 is placed in-line with the bus controller 120, and responsive to the intrusion detection device 140 determining that a message is unauthorized, the intrusion detection device 140 can be configured to block the unauthorized message (e.g., messages that violate one or more of the predefined rules). In such an example, it can be ascertained that the intrusion detection device 140 does not pass messages from the bus controller 120 onto the bus 110 until after such messages have been received and analyzed by the intrusion detection device 140. Similarly, the intrusion detection device 140 does not pass messages to the bus controller 120 until after the messages have been analyzed by the intrusion detection device 140. When the intrusion detection device 140 determines a message from or to the bus controller 120 is unauthorized, the intrusion detection 140 can prevent the message from reaching its intended destination.

In another embodiment, the intrusion detection device 140 can be configured to buffer messages that are received from the bus controller 120 and remote terminals 130-134 (by way of the bus 110), while allowing the messages to reach their intended destinations. In this embodiment, it is possible that a recipient device may receive an unauthorized message prior to the intrusion detection device 140 ascertaining that the message is unauthorized. In such a case, however, the intrusion detection device 140 can take preventative action, such as informing the bus controller 120 to at least temporarily cease all communications, to block data messages that are sent subsequent to the unauthorized message, or to cause a reset message of some sort to be transmitted to an at-risk terminal.

Figure 2:
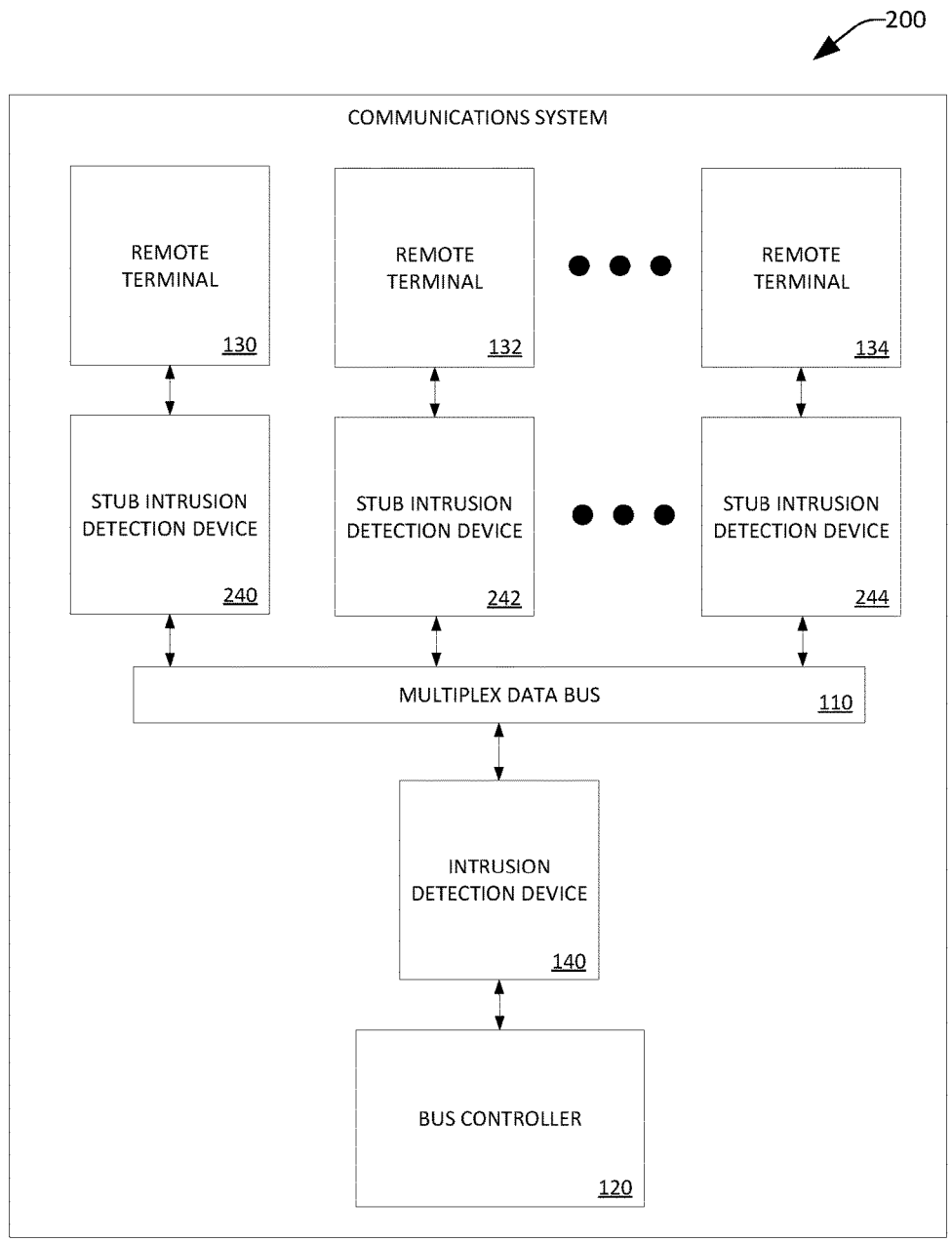
FIG. 2 is a functional block diagram of an exemplary communications system where communications are transmitted over a multiplex data bus, and wherein the communications system includes several intrusion detections devices that are configured to detect rogue terminal attacks.

With reference now to FIG. 2, another exemplary communications system 200 that is configured with intrusion detection devices is illustrated. In the exemplary communications system 200, n stub intrusion detection devices 240-244 can be respectively incorporated between the bus 110 and the n remote terminals 130-134. Each of the stub intrusion detection devices 240-244 receives messages on a primary port from the bus 110 (e.g., placed on the bus by one of the remote terminals 130-134) and transmits messages on a secondary port to the bus 110. Each of the stub intrusion detection devices 240-244 can receive messages from the bus 110 on the secondary port and transmit the messages to the respective remote terminals 130-134 on the primary port. Based upon whether a stub intrusion detection device receives a message on the primary port or the secondary port, the stub intrusion detection device can determine whether the message originates from a connected remote terminal 130-134 or from the bus 110.

Details of operation of the stub intrusion detection devices 240-244 are now described. The stub intrusion detection devices 240-244 operate similarly to the instruction detection device 140. The stub intrusion detection devices 240-244 provide detection and mitigation of rogue terminal attacks for the communications system 200. In an example, the stub intrusion detection device 240 receives messages from the remote terminal 130 that are to be placed on the bus 110, and also receives messages generated by the remote terminals 132-134 that have been placed on the bus 110. The architecture of the communications system 200 set forth in FIG. 2, then, provides additional security compared to the architecture of the communications system 100 set forth in FIG. 1, as in the communications system 200, the remote terminals 130-134 are unable to place messages on the bus 110 without the messages being analyzed by their respective stub intrusion devices 240-244.

In one exemplary embodiment, each stub intrusion detection device in the stub intrusion detection devices 240-244 determines whether a message is unauthorized based a set of predefined rules (which may be different from the rules employed by the intrusion detection device 140). Exemplary rules that can be employed by a stub intrusion detection device include: 1) a remote terminal cannot issue a message comprising a bus control command word; and 2) a remote terminal can only issue messages that identify the sender as being the remote terminal. It can be ascertained that other predefined rules can be implemented. After determining that a message violates one or more of the predefined rules, a stub intrusion detection device can output a notification that a that an unauthorized message has been detected.

Further, similar as to what has been described above with respect to the intrusion detection device 140, the stub intrusion detection devices 240-244 can block unauthorized messages prior to the messages reaching the bus 110 (or prior to a remote terminal being provided the message), or can buffer messages while allowing such messages to reach the bus 110 (where remedial action can be taken later).

Figure 3:
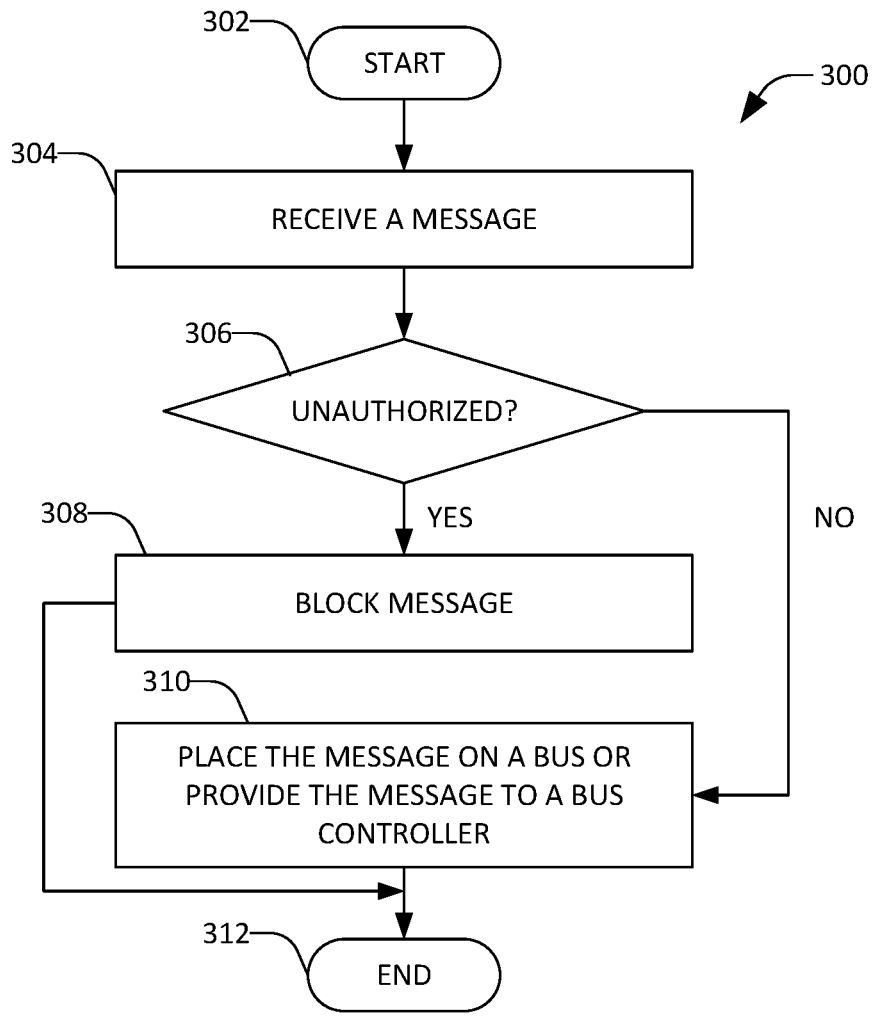
FIG. 3 is a flow diagram that illustrates an exemplary methodology for detection of rogue terminal attacks on multiplex data buses.

Referring now to FIG. 3, an exemplary methodology 300 that facilitates detection and mitigation of rogue terminal attacks on multiplex data buses is illustrated. In an example, the methodology 300 is executed by an intrusion detection device, which can be a hardware logic controller, such as an FPGA. The methodology 300 begins at 302 and, at 304, a message is received at a hardware logic controller from at least one of a bus controller or a remote terminal, where the bus controller and the remote terminal communicate with one another by way of a multiplex data bus. At 306, a determination is made as to whether the message is unauthorized. This determination can be made, as described above, through use of a set of rules or a state machine model. At 308, when it is determined that the message is unauthorized, the hardware logic controller blocks the message. At 310, when it is determined that the message is authorized, the hardware logic controller causes the message to either be placed on the bus or provided to the bus controller. The methodology 300 completes at 312.

Figure 4:
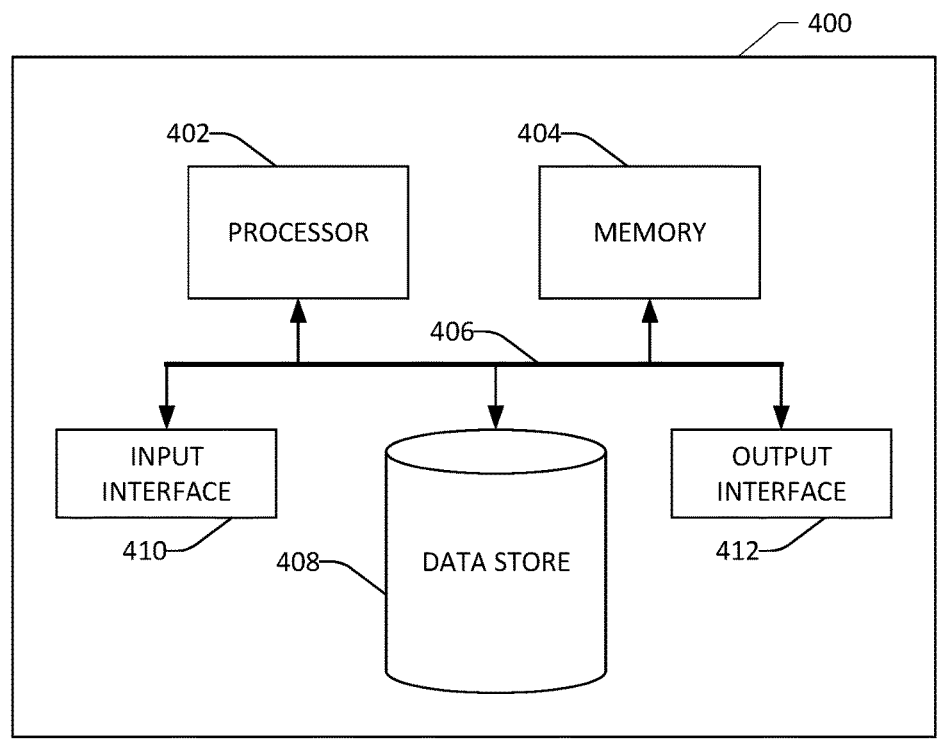
FIG. 4 illustrates an exemplary computing device.

Referring now to FIG. 4, a high-level illustration of an exemplary computing device 400 that can be used in accordance with the systems and methodology disclosed herein is illustrated. For example, the computing device 400 may be utilized to output a notification that an intrusion detection device has detected an unauthorized message. For example, the computing device 400 can operate as the computing system 430 and/or a portion thereof. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store signatures, time-series signals, etc.

The computing device 400 additionally includes a data store 408 that is accessible by the processor 402 by way of the system bus 406. The data store 408 may include executable instructions, test signatures, standard signatures, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A communications system comprising:
a multiplex data bus;
a bus controller configured to issue commands by way of the multiplex data bus to a plurality of remote terminals that send and receive messages over the multiplex data bus;
a hardware logic controller in communication with the bus controller and the multiplex data bus, the hardware logic controller connected between the bus controller and the multiplex data bus such that the bus controller receives messages from the multiplex data bus and transmits messages to the multiplex data bus by way of the hardware logic controller, and wherein the hardware logic controller is configured to:
receive a message from the bus controller, wherein the message is addressed to a remote terminal in the plurality of remote terminals;
responsive to receiving the message, determine whether or not the message would cause the remote terminal in the plurality of remote terminals to operate outside an operating limit of the remote terminal; and
responsive to determining that the message would cause the remote terminal in the plurality of remote terminals to operate outside the operating limit, block the message, thereby preventing the message from being placed on the multiplex data bus; and
a stub intrusion detection device, wherein the stub intrusion detection device is interposed between the remote terminal and the multiplex data bus such that the remote terminal receives messages from the multiplex data bus by way of the stub intrusion detection device and further such that the remote terminal transmits messages to the multiplex data bus by way of the stub intrusion detection device, the stub intrusion device configured to:
- receive, from the multiplex data bus, a second message;
- determine whether the second message is authorized;
- responsive to determining that the second message is authorized, output the second message to the remote terminal; and
- responsive to determining that the second message is unauthorized, block the second message, thereby preventing the second message from being output to the remote terminal.

2. The communications system of claim 1, wherein the multiplex data bus conforms to MIL-STD-1553B.

3. The communications system of claim 1, wherein the hardware logic controller is further configured to:
- responsive to determining that the message would cause the remote terminal in the plurality of remote terminals to operate outside the operating limit, output a notification that the message is unauthorized.

4. The communications system of claim 1, wherein the hardware logic controller determines that the message is from the bus controller based upon the message being received at a primary port of the hardware logic controller.

5. The communications system of claim 1, wherein the hardware logic controller is further configured to:
- receive a third message from the multiplex data bus, wherein the third message is placed upon the multiplex data bus by the remote terminal;
- responsive to receiving the third message, determine whether or not the third message is unauthorized; and
- when the third message is unauthorized, block the third message, thereby preventing the third message from being received by the bus controller.

6. The communications system of claim 5, wherein the hardware logic controller determines that the third message is from the multiplex data bus based upon the third message being received at a secondary port of the hardware logic controller, and further wherein the hardware logic controller determines that the third message is unauthorized based upon the third message comprising a bus command.

7. The communications system of claim 1, wherein the hardware logic controller determines that the message would cause the remote terminal in the plurality of remote terminals to operate outside the operating limit based upon a state machine model for the communications system, the state machine model defines authorized state transitions of the communications system.

8. A communications system comprising:
- a multiplex data bus;
- a bus controller configured to issue commands by way of the multiplex data bus to a plurality of remote terminals that send and receive messages over the multiplex data bus;
- a hardware logic controller in communication with the bus controller and the multiplex data bus, the hardware logic controller interposed between the bus controller and the multiplex data bus such that the bus controller receives messages from the multiplex data bus by way of the hardware logic controller and further such that the bus controller transmits messages to the multiplex data bus by way of the hardware logic controller, and wherein the hardware logic controller is configured to:
  - receive a message from the multiplex data bus, wherein the message is placed upon the multiplex data bus by a remote terminal in the plurality of remote terminals;
  - responsive to receiving the message, determine whether or not the message would render the multiplex data bus inoperable if received by the bus controller;
  - responsive to determining that the message would not render the multiplex data bus inoperable, output the message to the bus controller; and
  - responsive to determining that the message would render the multiplex data bus inoperable, block the message, thereby preventing the message from being received by the bus controller; and
- a stub intrusion detection device, wherein the stub intrusion detection device is incorporated between the remote terminal and the multiplex data bus such that the remote terminal receives messages from the multiplex data bus by way of the stub intrusion detection device and further such that the remote terminal transmits messages to the multiplex data bus by way of the stub intrusion detection device, the stub intrusion device configured to:
  - receive, from the remote terminal, a second message;
  - determine whether the second message is authorized;
  - responsive to determining that the second message is authorized, output the second message to the multiplex data bus; and
  - responsive to determining that the second message is unauthorized, block the second message, thereby preventing the second message from being output to the multiplex data bus.

9. The communications system of claim 8, wherein the multiplex data bus conforms to MIL-STD-1553B.

10. The communications system of claim 8, wherein the hardware logic controller is further configured to:
- responsive to determining that the message would render the multiplex data bus inoperable, output a notification that the message is unauthorized.

11. The communications system of claim 8, wherein the hardware logic controller determines that the message is from the multiplex data bus based upon the message being received at a secondary port of the hardware logic controller.

12. The communications system of claim 8, wherein the hardware logic controller determines that the message would render the multiplex data bus inoperable based upon a state machine model for the communications system, the state machine model defines authorized state transitions of the communications system.

13. The communications system of claim 8, wherein determining whether or not the message would render the multiplex data bus inoperable if received by the bus controller comprises determining whether the message would cause the bus controller to perform a firmware update.

14. A communications system comprising:
- a multiplex data bus;
- a bus controller;
- a plurality of remote terminals, wherein the bus controller and the plurality of remote terminals communicate with one another by way of the multiplex data bus;
- an intrusion detection device incorporated between the bus controller and the multiplex data bus such that the bus controller receives messages from the multiplex data bus and transmits messages to the multiplex data bus by way of the hardware logic controller, wherein the intrusion detection device is configured to:

receive a message from the bus controller that is addressed to a remote terminal in the plurality of remote terminals, wherein the message is received prior to the message being placed on the bus;

determine that the message would not cause the remote terminal in the plurality of remote terminals to operate outside an operating limit and would not cause the communications system to be rendered inoperable; and place the message on the bus only after determining that the message would not cause the remote terminal in the plurality of remote terminals to operate outside the operating limit and would not cause the communications system to be rendered inoperable; and a stub intrusion detection device, wherein the stub intrusion detection device is interposed between the remote terminal and the multiplex data bus such that the remote terminal receives messages from the multiplex data bus by way of the stub intrusion detection device and further such that the remote terminal transmits messages to the multiplex data bus by way of the stub intrusion detection device, the stub intrusion device configured to:

receive, from the multiplex data bus, a second message;

determine whether the second message is authorized;

responsive to determining that the second message is authorized, output the second message to the remote terminal; and responsive to determining that the second message is unauthorized, block the second message, thereby preventing the second message from being output to the remote terminal.

15. The communications system of claim 14, wherein the multiplex data bus conforms to MIL-STD-1553B.

16. The communications of claim 14, wherein the intrusion detection device is a field-programmable gate array (FPGA).

17. The communications system of claim 14, wherein the stub intrusion detection device is an FPGA.

* * * * *